US006534888B1

United States Patent
Vorberg et al.

(10) Patent No.: US 6,534,888 B1
(45) Date of Patent: Mar. 18, 2003

(54) ELECTRIC MOTOR INTENDED TO BE FIXED TO A PRINTED CIRCUIT BOARD

(75) Inventors: Thomas Vorberg, Aschaffenburg (DE); Markus Keutz, Rossdorf (DE); Heinrich-Jochen Blume, Darmstadt (DE); Peter Schmidt, Frankfurt (DE); Sabine Vorberg, Aschaffenburg (DE); Klaus Kronenberg, Sulzbach (DE); Frank Weiand, Aschaffenburg (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/527,168

(22) Filed: Mar. 16, 2000

(30) Foreign Application Priority Data

Mar. 19, 1999 (DE) .......................... 199 12 533
Mar. 3, 2000 (DE) .......................... 100 10 609

(51) Int. Cl.⁷ .......................... H02K 11/00; H02K 29/00
(52) U.S. Cl. ..................... 310/91; 310/71; 310/DIG. 6; 310/67 R
(58) Field of Search .......................... 310/91, 66, 67 R, 310/42, 71, DIG. 6, 239, 254, 258, 259, 216, 217, 218; 361/760, 807, 810, 811

(56) References Cited

U.S. PATENT DOCUMENTS

| 2,941,439 | A | * | 6/1960 | Rapata | 411/41 |
|---|---|---|---|---|---|
| 3,393,599 | A | * | 7/1968 | Fisher | 411/41 |
| 3,513,509 | A | * | 5/1970 | Gross | 174/138 D |
| 3,836,704 | A | * | 9/1974 | Coules | 174/138 D |
| 4,673,834 | A | * | 6/1987 | Wrobel | 310/71 |
| 4,747,199 | A | * | 5/1988 | Kitchen | 264/163 |
| 4,783,608 | A | * | 11/1988 | Gruber et al. | 310/90 |
| 4,800,307 | A | * | 1/1989 | Papst | 310/67 R |
| 5,565,719 | A | * | 10/1996 | Kuhlmann | 310/47 |
| 5,672,927 | A | * | 9/1997 | Viskochil | 310/194 |
| 5,825,115 | A | * | 10/1998 | Kronenberg et al. | 310/254 |
| 5,942,831 | A | * | 8/1999 | Yamada et al. | 310/217 |
| 5,973,428 | A | * | 10/1999 | Zakrocki et al. | 310/71 |
| 6,069,427 | A | * | 5/2000 | Strahm et al. | 310/217 |
| 6,194,797 | B1 | * | 2/2001 | Simon et al. | 310/49 R |
| 6,249,068 | B1 | * | 6/2001 | Knopp | 310/71 |
| 6,366,465 | B1 | * | 4/2002 | Baur et al. | 361/752 |

FOREIGN PATENT DOCUMENTS

| DE | 19616077 | | 4/1997 |
|---|---|---|---|
| DE | 19810873 | | 11/1998 |
| DE | 19724664 | | 12/1998 |
| JP | 10-117460 | * | 5/1998 |

* cited by examiner

*Primary Examiner*—Dang Dinh Le
(74) *Attorney, Agent, or Firm*—Martin A. Farber

(57) ABSTRACT

In an electric motor intended to be fixed to a printed circuit board, provision is made for it to have at least one expanding dowel (4), for it to be possible for the motor (1) to be fixed to a printed circuit board (6, 32) by the expanding dowel or dowels (4) being expanded, and by it being possible for the expanding dowel or dowels (4) to be secured at least by a pin (7).

4 Claims, 4 Drawing Sheets

ELECTRIC MOTOR INTENDED TO BE FIXED TO A PRINTED CIRCUIT BOARD

FIELD AND BACKGROUND OF THE INVENTION

The invention relates to an electric motor intended to be fixed to a printed circuit board.

The prior art discloses electric motors, in particular as meter mechanisms in motor vehicle display instruments, in which the coil ends of the electric motors are electrically conductively connected to pins which, in a push-through mounting operation, are electrically conductively connected to a rigid printed circuit board, for example by flow soldering. In addition, the prior art discloses electric motors which are connected to a rigid printed circuit board by means of screws. The drawback in this case is the additional, time-consuming screwing operation and the complicated securing of the screws against inadvertent loosening.

SUMMARY OF THE INVENTION

The object of the invention is therefore to provide an electric motor which can be connected simply and permanently to a printed circuit board.

The object is achieved in that the motor has at least one expanding dowel, that the motor can be fixed to a printed circuit board by the expanding dowel being expanded, and that at least one expanding dowel can be secured by a pin.

The expanding dowel can be expanded by its consisting of an elastic material and, during the mounting, being compressed for a time and led through cutouts in a printed circuit board, and subsequently being able to assume its original shape again. In this way, the motor is fixed to the printed circuit board. In order to prevent the expanding dowel being compressed again, the expanding dowel can be secured by a pin. This effectively prevents the expanding dowel being compressed again following the mounting operation.

It is also possible for the pin, on its own, to effect or at least to assist the expansion of the expanding dowel. As a result, the expanding dowel is fixed to the printed circuit board even more firmly.

Inserting the pine axially into the expanding dowels permits very straightforward mounting of the motors by pressing in the pins from a direction above the printed circuit board.

The mounting operation is simplified further if the pins are detachably connected to the expanding dowel before the mounting operation. This means that it is possible to dispense with feeding the pins separately.

The connection can be carried out, for example, via webs. In this way, the pin and the expanding dowel can be produced in one piece as an injection molding.

By means of a force acting axially on the pins, the webs then break, given an appropriate design, and the pins can then be inserted into the interior of the expanding dowels in order to secure them.

The fact that the contact springs are configured in such a way that, after the electric motor has been fixed to the printed circuit board, they are in contact under prestress with electrical conductors on the printed circuit board, means that an additional soldering operation can be dispensed with, given an appropriately corrosion-resistant material of the surfaces o the contact springs, such as tin, gold or platinum.

The configuration of the motor is particularly simple if the contact springs are fixed to the coils.

A casing, which has openings for the contact springs, and through which the contact springs protrude out of the casing, firstly projects the motor against external influences, also simplifies the mounting operation and permits direct mounting of the contact springs on the coils.

If the contact springs are configured in such a way that, after the motor has been mounted on the printed circuit board, they are in contact underneath the casing, space on the printed circuit board is also saved. In addition, the casing can then be configured in such a way that, following the mounting of the motor on the printed circuit board, the printed circuit board completely covers the openings and the casing is therefore closed. The mechanical and electrical components of the motor are thus protected better, in particular against the action of heat, for example during surface mounting of other components on the printed circuit board, needed following the mounting operation.

By configuring the contact springs in such a way that, after the motor has been mounted on the printed circuit board, they are in contact at the side of the casing, the contact spring can also be soldered to conductors on the printed circuit board during surface mounting, if particular requirements are placed on the durability of the electrical connection, In this case, the opening in the casing can be configured such that the casing largely protects the motor, so that the action of heat, arising for example from a reflow soldering operation, does not damage the motor.

A simple mounting operation for the contact springs results if the coils each have a coil former and the contact springs are fixed on or in the coil former. The mounting operation can be carried out particularly simply if the coil former is configured as an injection molding and the contact springs are encapsulated by injection molding with parts of the coil former.

A permanent electrical connection between the coil windings and the contact springs may be produced by the ends of the coil windings being electrically conductively fixed to the contact springs, for example by soldering or welding, and the contact springs then being bent over at these ends in such a way that the coil ends are relieved of stress.

A compact design of the electric motor may be achieved by the stator plates forming a stator which, at the center, has an opening to accommodate the rotor, the individual stator plates being arranged around the opening. The motor becomes particularly compact if it has four stator plates and two coils.

If two opposite stator plates are simply bent over toward each other in such a way that parts of the stator plates are aligned parallel to each other, between which the first coil is arranged in a magnetically coupled fashion, and if the two other stator plates have a first bend in the vicinity of the opening and a second bend in the vicinity of the free ends, and the second coil is magnetically coupled between the free ends, the coils can be arranged in parallel at the same height and can thus be configured identically.

If the stator plates are magnetically coupled at the openings, they can be produced together, in one piece, from a metal plate.

If the stator plates are connected to one another at the opening via a nonmagnetic metal, the motor can be driven particularly easily.

By welding coil cores of the coils to the stator plates, the coils can be magnetically coupled rapidly, permanently and effectively to the stator plates.

BRIEF DESCRIPTION OF THE DRAWINGS

The invention will, be explained in more detail below using the figures of the drawings for particularly preferred exemplary embodiments, in which.

DETAILED DESCRIPTION OF THE PREFERRED EMBODIMENT

Figure 1:
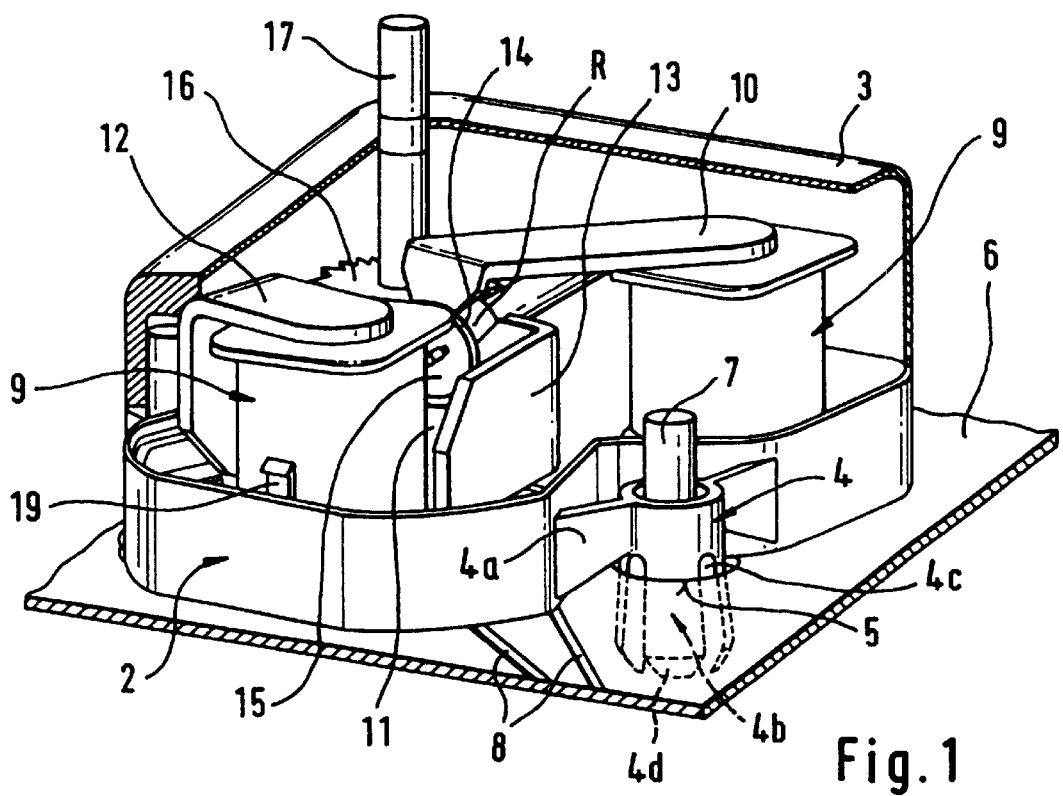
FIG. 1 shows the elevation and the partial section of a particularly preferred motor on the partial elevation of a printed circuit board.
Figure 2:
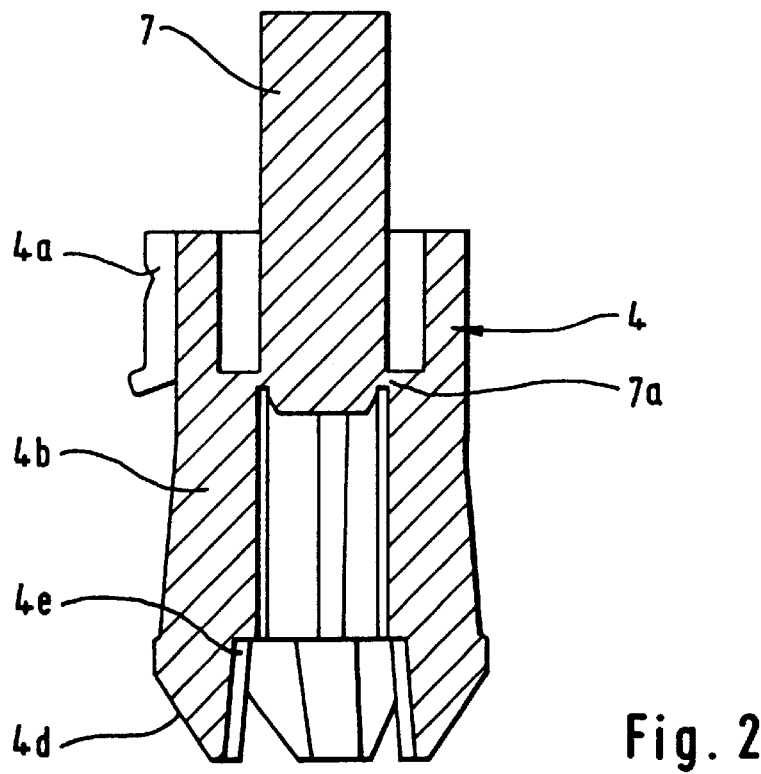
FIG. 2 shows the section through an expanding dowel and a pin.

In FIG. 1, a particularly preferred electric motor has a casing, comprising a lower casing part 2 and an upper casing part 3. Expanding dowels 4 have a rotationally symmetrical shape and are connected to the remaining lower casing part 2 by webs 4a. The expanding dowels 4 are divided up into arms 4b by means of slots 4c extending axially. As a result of the slots 4c and the tapering ends 4d, it is possible to compress the expanding dowels 4 and to push them through round holes 5 in a printed circuit board 6, the diameter of the round holes 5 being smaller than the diameter of the expanding dowel 4 in the uncompressed state illustrated in FIG. 2. As a result of the elasticity of the expanding dowel 4, or as the result of the insertion of a pin 7 into the expanding dowel 4, the expanding dowel 4 assumes its original shape, so that the motor 1 is fixed to the printed circuit board 6. By means of the inserted pin 7, the expanding dowel 4 is secured against the arms 4b becoming compressed, so that the connection of the motor 1 to the printed circuit board 6 is very durable. The webs 7a (see FIG. 2) of the pin 7 are designed such that they break under an axial pressure on the pin 7. The pin 7 can then be inserted into the expanding dowel 4 by further axial pressure from above on the pin 7. In this way, the motor 1 is pressed with the underside of its lower casing part 2 onto the printed circuit board 6 by the expanding dowels 4 led through the round holes 5 and expanded again. At the same time, contact springs (not illustrated in FIG. 1) are pressed onto the printed circuit board 6 and connected electrically to electrical conductors 8 located on the printed circuit board 6. Moreover, it can be seen in FIG. 2 that the arms 4b of the expanding dowel have latching tabs 4e in their lower region, into which the pin 7 can latch with those parts of the webs 4a which have remained on the pin following the breakage of the webs 7a, when the pin is inserted into the expanding dowel 4. The pin 7 is additionally secured against falling out of the expanding dowel 4 by the pressure of the arms 4b on the pin 7.

In FIG. 1, it is also possible to see coils 9, which are inserted into a stator comprising stator plates 10, 11, 12, 13. The stator plates 10, 11, 12, 13 are connected to one another, in the region of an opening 14, via a ring R of nonmagnetic metal, for example brass. This connection can comprise, for example, projection-welding the stator plates 10, 11, 12, 13 to the ring R. A diametrically magnetized disk 15 is connected, via a shaft not illustrated in FIG. 1 and the worm arranged on the shaft and likewise not illustrated in FIG. 1, to a worm wheel 16, which in the axial direction is connected on both sides to a worm-wheel shaft 17. The worm-wheel shaft 17 is mounted in the lower casing part 2 in the worm-wheel shaft bearing 18 (see FIG. 3) and in the upper casing part 3 in a bearing (not illustrated). The upper casing part 3 is seated on the lower casing part 2 and is held firmly by latching clips, of which the latching clip 19 is illustrated in FIG. 1.

Figure 3:
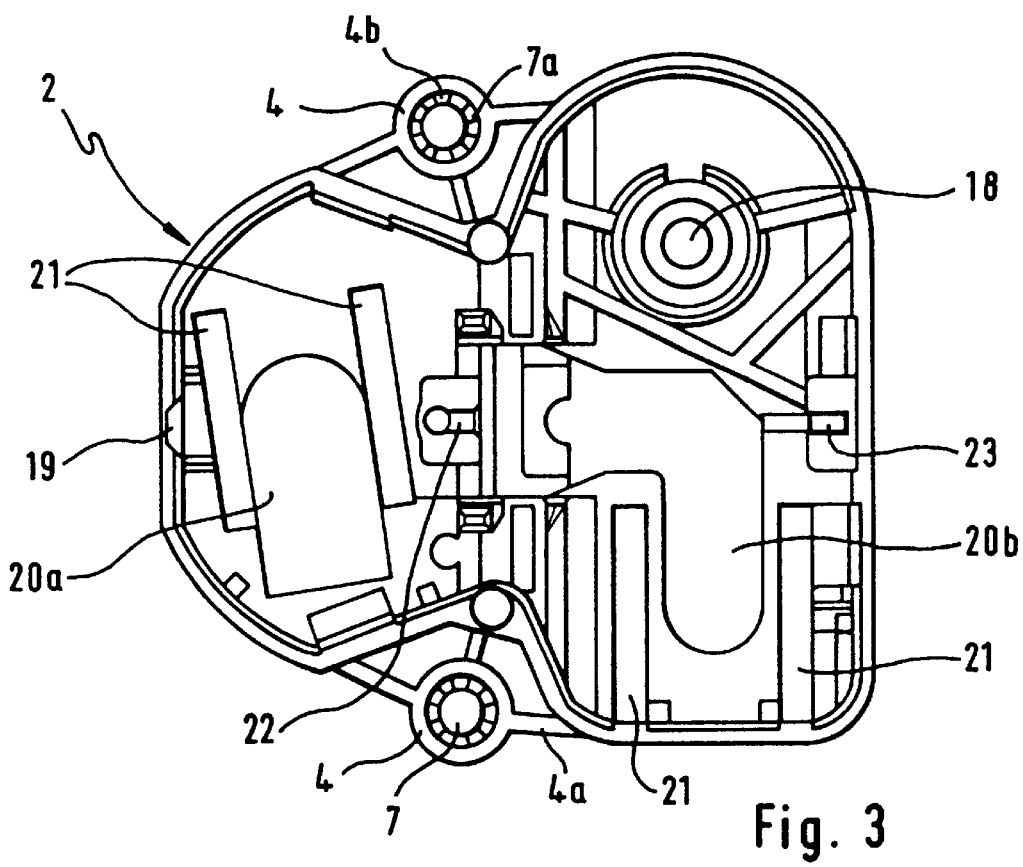
FIG. 3 shows a plan view of a particularly preferred lower casing part of the electric motor according to the invention.

In FIG. 3, the lower casing part 2 has two flat hollows 20a, 20b, four openings in the form of longitudinal slots 21, shaft bearings 22, 23, the worm-wheel shaft bearing 18, expanding dowels 4 with pins 7, and a latching clip 19. The flat hollows 20a, 20b are configured such that the stator plate 11 can rest in the hollow 20a and the stator plate 13 can rest in the hollow 20b, and therefore the stator, comprising stator plates 10, 11, 12, 13 and coils 9, can assume a predetermined position in the lower casing part 2. In this case, contact springs then protrude out of the lower casing part through the longitudinal slots 21. The shaft illustrated in FIG. 5 can be mounted in the shaft bearings 22, 23 and then assumes the correct position in the stator described in FIGS. 4 and 5. In addition, it is possible to see the expanding dowels 4, which are connected to the pin 7b via webs 7a.

Figure 4:
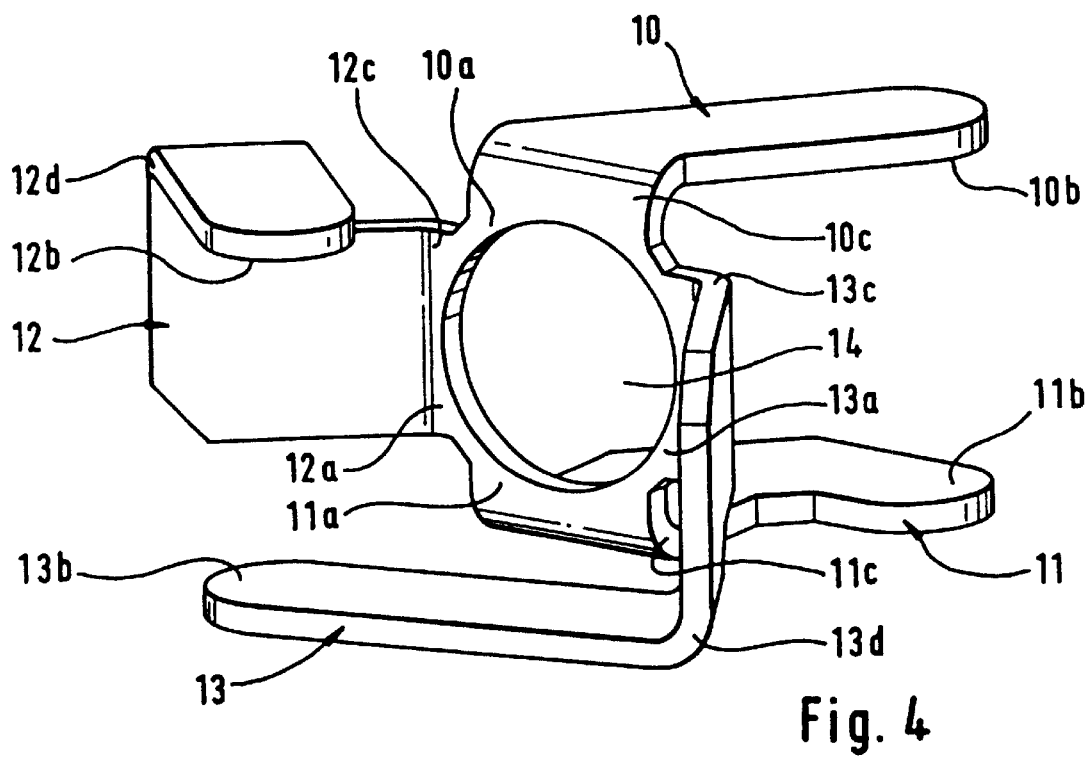
FIG. 4 shows the perspective view of a particularly preferred exemplary embodiment of the stator plates of the electric motor according to the invention.

In FIG. 4, it is possible to see the four stator plates 10, 11, 12, 13, which with their one end 10a, 11a, 12a, 13a form an opening 14 to accommodate a rotor and are magnetically coupled at the opening 14. The stator plates 10, 11, 12, 13 are bent in such a way that in each case two stator plates 10, 11 and 12, 13 are each located with one end 11b, 11band 12b, 13b parallel to each other in order to accommodate the coils 9 illustrated in FIG. 1. In order to be given this shape, the stator plates 10, 11 each have a bend 10c, 11c and the stator plates 12, 13 each have two bends 12c, 12d, 13c, 13d.

Figure 5:
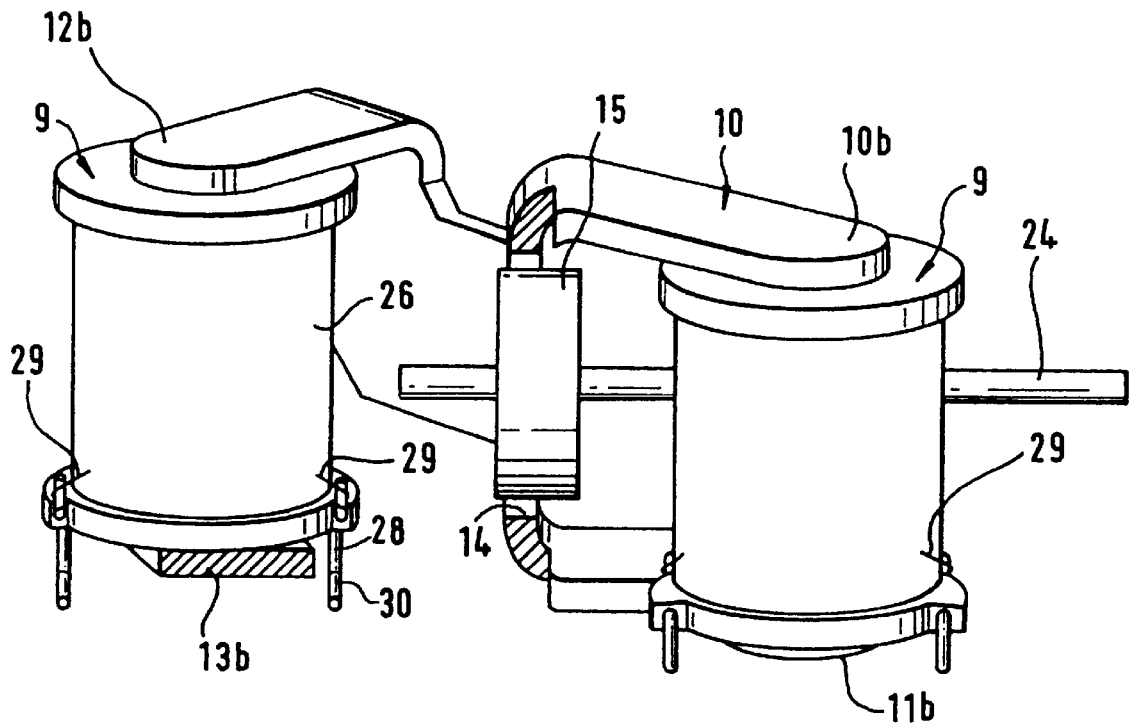
FIG. 5 shows the perspective view and the partial section of a stator interacting with a rotor.

In FIG. 5, in each case one coil 9 is arranged between two ends 10b, 11b and 12b, 13b of the stator plates 10, 11, 12, 13. It is preferable for coil cores 25 (not visible in FIG. 5) to be welded to the stator plates 10, 11, 12, 13 in the region of the ends 10b, 11b, 12b, 13b. This has the effect of a stable, rapid connection and, at the same time, good onward conduction of the magnetic flux. However, the connection between the stator plates 10, 11, 12, 13 and the coils 5 can also be carried out by means of other connection techniques, such as screwing or riveting.

It in also possible to see in FIG. 5 the rotor, comprising the diametrically magnetized disk 15, which is arranged largely in the opening 14 and is connected firmly to the shaft 24 so as to rotate with it. Preferably arranged on the shaft 24 is a worm (not illustrated), which interacts with the worm wheel 16 illustrated in FIG. 1. The mounting of the shaft 24 is not illustrated either in FIG. 5. If current is applied to the two coils 1, they produce a magnetic flux, which is conducted via the stator plates 10, 11, 12, 13 and exerts a force on the diametrically magnetized disk 15. It is thus possible for the electric motor to be operated as a stepping motor, for example, if the coils are energized with DC one after another or else simultaneously. It is also possible, by driving the two coils 9 with sinusoidal currents offset by 90°, to operate the motor as a synchronous motor, in which the rotational speed of the shaft 24 corresponds to the frequency of the sinusoidal currents.

Figure 6:
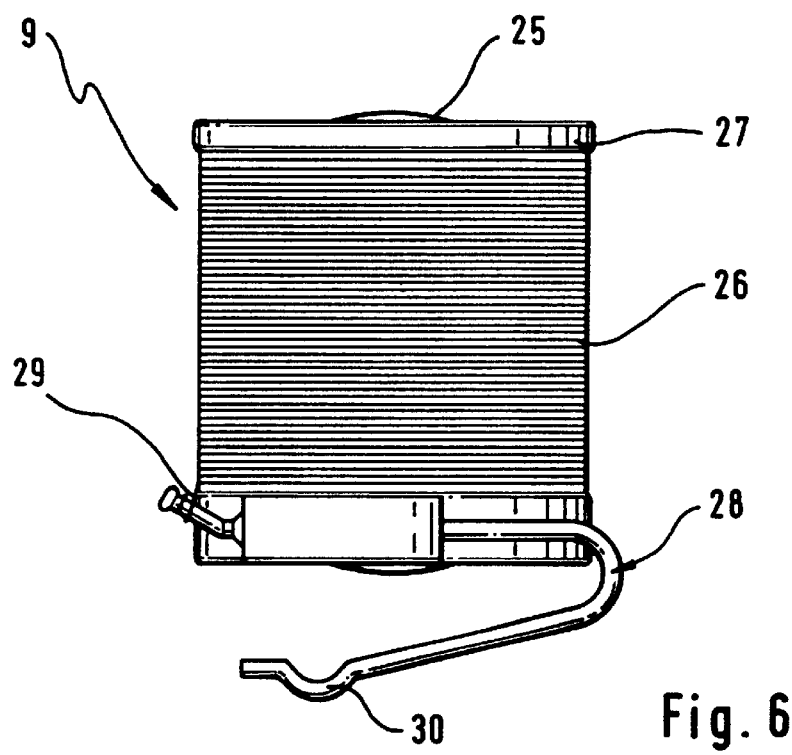
FIG. 6 shows the elevation of a particularly preferred embodiment of a coil of the electric motor according to the invention.

The exemplary embodiment in FIG. 6 of a particularly preferred coil 9 has a coil winding 26, a coil former 27, two contact springs 28 and the coil core 25. The coil winding 26 is wound onto the injection-molded coil former 27, in which parts of the contact springs 28 are encapsulated by injection molding with the material of the coil former 27 and are thus fixed. Winding ends 29 of the coil winding 26 are in each case electrically conductively connected to one end of a contact spring 28, for example by soldering or welding. Following the connection, the appropriate end of the contact spring 28 is bent over upward as illustrated, in order to relieve the stress on the end of the coil winding 26. The contact springs 28 are produced from a strip spring material and, approximately at the center, are bent through about 165°, an can be seen from FIG. 6. At their other end, the contact springs 28 have a contact stud 30, which is intended to make contact with an electrical conductor 8 (see FIG. 1) on a printed circuit board. The above-described embodiment is provided when an electric motor with a casing is used for making contact underneath the casing.

Figure 7:
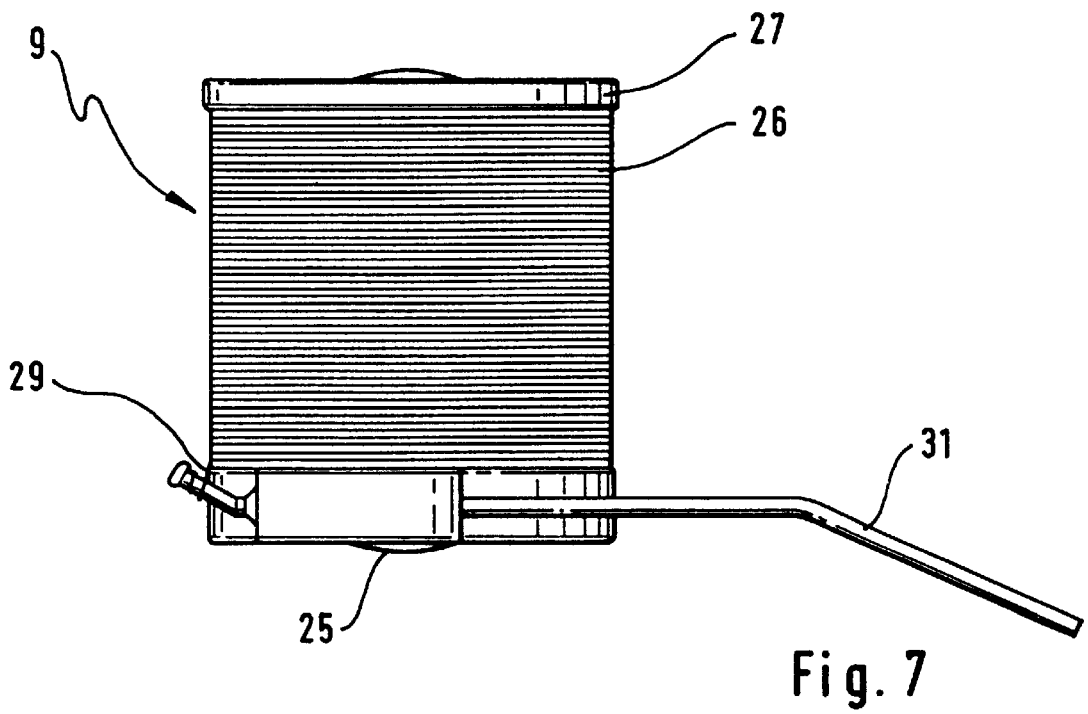
FIG. 7 shows the elevation of a second particularly preferred embodiment of a coil of the electric motor according to the invention.

The coil illustrated in FIG. 7 differs from the coil illustrated in FIG. 6 in that its contact spring 31 is bent only through about 45°, approximately at its center. Otherwise, its other components, coil winding 26, coil former 27, coil core 25 and winding end 29, are the same as for the coil 1 in FIG. 1. This contact-spring design is provided when an electric motor with a casing is used to make contact at the side of the casing.

The use of the two above-described coils 9 is also possible in the case of a motor without a casing.

Figure 8:
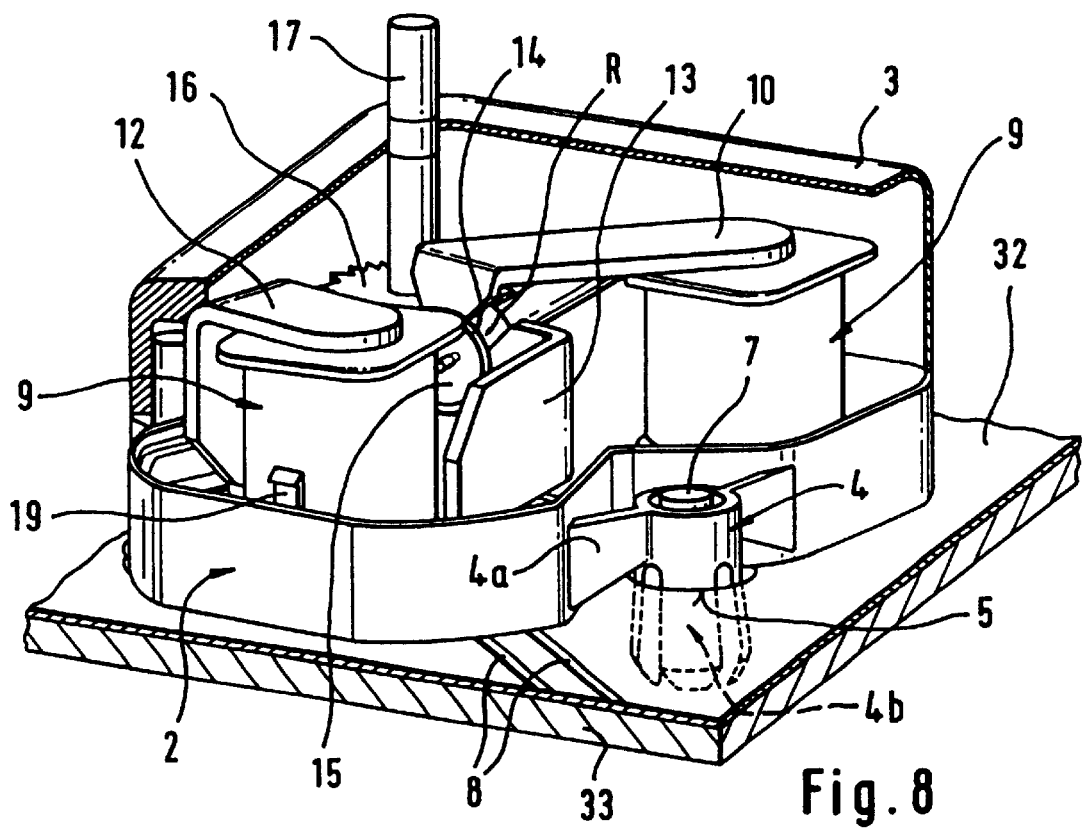
FIG. 8 shows the elevation of the motor from FIG. 1 on the partial elevation of a flexible printed circuit board, and of a supporting element located under the printed circuit board.

In FIG. 8, the electric motor 1 is resting on a flexible printed circuit board 32, which is located on a supporting element 33. Both the printed circuit board 32 and the supporting element 33 have round holes 5, through which the arms 4b of the expanding dowels 4 are led. In the case of the expanding dowel illustrated, the pin 7 is inserted into the expanding dowel 4 and thus prevents the arms 4b being able to be compressed. The arms 4b are pressed against the round hole 5 in the supporting element 33. In this way, the motor 1 is permanently connected to the supporting element 33 and, at the same time, is pressed onto the flexible printed circuit board 32.

We claim:

1. An electric motor intended to be fixed to a printed circuit board, wherein the motor has at least one expanding dowel (4), wherein the motor (1) can be fixed to a printed circuit board (6, 32) by the at least one expanding dowel (4) being expanded, and wherein the expanding dowel (4) is securable at least by a pin (7), wherein the motor (1) has contact springs (28, 31) which are electrically conductively connected to a respective winding end (29) of coils (9), wherein the contact springs (28, 31) are configured such that, after the electric motor has been fixed to the printed circuit board (6, 32), said springs are in contact under elastic prestress with electrical conductors (8) on the printed circuit board (6, 32), the coils (9) have a coil former (27), and wherein the contact springs (28, 31) are fixed in or on the coil former (27).

2. The electric motor as claimed in claim 1, wherein the coil former (27) is injection molded and the contact springs (28, 31) are encapsulated by injection molding with parts of the coil former (27).

3. The electric motor as claimed in claim 1, wherein winding ends (29) of coil windings (26) are each electrically conductively fixed to one end of a contact spring (28, 31), and wherein the contact springs (28, 31) are bent over at said end.

4. An electric motor intended to be fixed to a printed circuit board, wherein the motor has at least one expanding dowel (4), wherein the motor (1) can be fixed to a printed circuit board (6, 32) by the at least one expanding dowel (4) being expanded, and wherein the expanding dowel (4) is securable at least by a pin (7) wherein stator plates (10, 11, 12, 13) form a stator which, at the center, has an opening (14) to accommodate a rotor (15), the individual said stator plates (10, 11, 12, 13) being arranged around the opening (14) the stator plates (10, 11, 12, 13) are connected to one another at the opening (14) via a ring (R) of nonmagnetic metal.

* * * * *